(12) United States Patent
Chen et al.

(10) Patent No.: US 8,311,163 B2
(45) Date of Patent: Nov. 13, 2012

(54) TIME-FREQUENCY SYNCHRONIZATION AND FRAME NUMBER DETECTION FOR DMB-T SYSTEMS

(75) Inventors: Hou-Shin Chen, Edison, NJ (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 234 days.

(21) Appl. No.: 12/733,571

(22) PCT Filed: Jul. 23, 2008

(86) PCT No.: PCT/US2008/008930
§ 371 (c)(1),
(2), (4) Date: Mar. 9, 2010

(87) PCT Pub. No.: WO2009/045244
PCT Pub. Date: Apr. 9, 2009

(65) Prior Publication Data
US 2011/0002418 A1    Jan. 6, 2011

Related U.S. Application Data

(60) Provisional application No. 60/995,782, filed on Sep. 28, 2007.

(51) Int. Cl.
*H04L 27/06* (2006.01)
(52) U.S. Cl. ...................................... 375/340
(58) Field of Classification Search .................. None
See application file for complete search history.

(56) References Cited

U.S. PATENT DOCUMENTS

2004/0248602 A1 * 12/2004 Demir et al. .................. 455/502
2006/0062335 A1 *  3/2006 Lee et al. ...................... 375/343

FOREIGN PATENT DOCUMENTS

EP    1282258          2/2003
EP    1282258 A1 *    2/2003

(Continued)

OTHER PUBLICATIONS

An Introduction of the Chinese DTTB Standard and Analysis of the PN95 Working Modes, Mar. 2007, IEEE Transaction on Broadcasting.*

(Continued)

*Primary Examiner* — David C. Payne
*Assistant Examiner* — Wednel Cadeau
(74) *Attorney, Agent, or Firm* — Robert D. Shedd; Joseph J. Opalach

(57) ABSTRACT

A DMB-T receiver supports a single carrier (SC) form of modulation and a multi-carrier form of modulation such as orthogonal frequency division multiplexing (OFDM). Upon receiving a broadcast signal, the DMB-T receiver downconverts the received broadcast signal to a received base-band signal and determines a frame number for each frame by correlating groups of the received symbols in adjacent signal frames. In particular, the receiver determines a maximum right-shift correlation value and a maximum left-shift correlation value. If the magnitude of the maximum right-shift correlation value is greater than, or equal to, the magnitude of the maximum left-shift correlation value, then the maximum right shift correlation value is used to retrieve a frame number from a look-up table. Otherwise, the negative value of the maximum left-shift correlation value is used to retrieve a frame number from the look-up table.

10 Claims, 15 Drawing Sheets

FOREIGN PATENT DOCUMENTS

| | | |
|---|---|---|
| EP | 1717974 | 11/2006 |
| WO | WO0059147 | 10/2000 |

OTHER PUBLICATIONS

Cordeiro et al., Cognitive PHY and MAC Layers for Dynamic Spectrum Access and Sharing of TV Bands, Mar. 2006, First International Workshop on Technology and Policy for Accessing Spectrum.*

Zhang et al., An Introduction of the Chinese DTTB Standard and Analysis of the PN95 Working Modes, Mar. 2007, IEEE Transaction on Broardcasting.*

Zhang et al., An Introduction of the Chinese DTTB Standard and Analysis of the PN95 Working Modes, Mar. 2007, IEEE.*

Cordeiro et al., Cognitive PHY and MAC Layers for Dynamic Spectrum Access and Sharing of TV Bands, Mar. 2006, IEEE.*

Bolcskei.: "Blind Estimation of Symbol Timing and Carrier Frequency Offset in Wireless OFDM Systems," IEEE Transactions on Communications, vol. 49, No. 6, Jun. 2001, pp. 988-999.

Chen et al.: "Spectrum Sensing for DMB-T Systems Using PN Frame Headers," IEEE Int'l. Conference on Communications (ICC 2008), Piscataway, NJ, USA, May 19, 2008, pp. 4889-4893.

ETSI Standards EN 300 744: Digital Video Broadcasting (DVB); Framing Structure, Channel Coding and Modulation for Digital Terrestrial Television, vol. BC, No. V1.5.1, Nov. 1, 2004, LIS, Sophia Antipolis, Cedex, France, pp. 1-64.

Lv et al.: "Sensing Schemes for DVB-T," IEEE P802.22 Wireless RANs, doc.: IEEE 802.22-06/0127r2, Jul. 19, 2006.

Lv et al.: "Sensing Scheme for DVB-T," IEEE P802.22 Wireless RANs, doc.: IEEE 802.22-05/0263r0, Nov. 10, 2006, pp. 1-11.

Tufvesson et al.: "Time and Frequency Synchronization for OFDM Using PN-Sequence Sequence Preambles," VTC '99, IEEE, Sep. 1999, pp. 2203-2207.

Wang et al.: "A Combined Code Acquisition and Symbol Timing Recovery Method for TDS-OFDM," IEEE Transactions on Broadcasting, vol. 49, No. 3, Sep. 2003, pp. 304-308.

Zhang et al.: "An Introduction of the Chinese DTTB Standard and Analysis of the PN595 Working Modes," IEEE Transactions on Broadcasting, vol. 53, No. 1, Mar. 1, 2007, pp. 8-13.

International Search Report, dated Dec. 22, 2008.

* cited by examiner

*Prior Art*

US 8,311,163 B2

TIME-FREQUENCY SYNCHRONIZATION AND FRAME NUMBER DETECTION FOR DMB-T SYSTEMS

CROSS-REFERENCE TO RELATED APPLICATIONS

This application claims the benefit, under 35 U.S.C. §365 of International Application PCT/US2008/008930 filed Jul. 23, 2008 which was published in accordance with PCT Article 21(2) on Apr. 9, 2009 in English, and which claims the benefit of U.S. provisional patent application No. 60/995,782 filed Sep. 28, 2007.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Recently, the Digital Multimedia Broadcasting for Terrestrial Television (DMB-T) Standard was published for Digital Television (DTV) broadcasting in China ("Framing Structure, Channel Coding and Modulation for Digital Television Terrestrial Broadcasting System," NSPRC, August 2007). The DMB-T standard specifies that a receiver support a single carrier (SC) modulation mode and a orthogonal frequency division multiplexing (OFDM) modulation mode (a multicarrier mode). For the single carrier mode, Quadrature Amplitude Modulated (QAM) symbols are transmitted directly. For the multicarrier mode, QAM symbols are modulated by an inverse DFT (discrete Fourier transform) operation. The DMB-T signal comprises a hierarchical frame structure with signal frames providing the basic building block. A signal frame 10 is shown in FIG. 1. Signal frame 10 comprises a frame header 11 and a frame body 12. Frame header 11 has three frame header modes of different lengths. As can be observed from FIG. 1, these lengths are 420, 595 or 945 symbols. Frame body 12 conveys 3780 symbols, of which 36 symbols are system information and 3744 symbols are data. In a DMB-T system, a time-domain synchronous OFDM (TDS-OFDM) technique has been adopted. As such, the frame headers include pseudonoise (PN) sequences that serve as pilot signals and which are also used as guard intervals instead of cyclic prefixes as found in typical OFDM transmission such as used in DVB-T (Terrestrial) (e.g., see ETSI EN 300 744 V1.4.1 (2001-01), *Digital Video Broadcasting (DVB); Framing structure, channel coding and modulation for digital terrestrial television*) used in Europe.

SUMMARY OF THE INVENTION

As described above, a DMB-T signal comprises signal frames. A signal frame comprises a frame header and a frame body. There are three frame header modes (modes) defined in the DMB-T Standard and the structure for each mode is different. The frame headers of the different modes include pseudonoise (PN) sequences, which are inserted as guard intervals instead of cyclic prefixes as found in typical OFDM transmission such as the above-mentioned DVB-T. The PN frame headers in modes 1 and 3 are also designed to indicate signal frame numbers in DMB-T. In that regard, recognition of the PN sequence used in frame header modes 1 and 3 can be used to detect the frame number. In particular, and in accordance with the principles of the invention, a receiver receives a signal for providing a sequence of received symbols, the received signal having an associated signal frame structure, each frame comprising a group of received symbols; and determines a frame number for each frame by correlating groups of the received symbols in adjacent signal frames.

In an illustrative embodiment of the invention, the receiver is a DMB-T receiver and supports a single carrier (SC) form of modulation and a multi-carrier form of modulation such as orthogonal frequency division multiplexing (OFDM). Upon receiving a broadcast signal, the receiver downconverts the received broadcast signal to a received base-band signal and determines a frame number for each frame by correlating groups of the received symbols in adjacent signal frames. In particular, the receiver determines a maximum right-shift correlation value and a maximum left-shift correlation value. If the magnitude of the maximum right-shift correlation value is greater than, or equal to, the magnitude of the maximum left-shift correlation value, then the maximum right shift correlation value is used to retrieve a frame number from a look-up table. Otherwise, the negative value of the maximum left-shift correlation value is used to retrieve a frame number from the look-up table.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternating Lines), SECAM (SEquential Couleur Avec Memoire), ATSC (Advanced Television Systems Committee), Chinese Digital Television System (GB) 20600-2006 and networking, such as IEEE 802.16, 802.11h, etc., is assumed. Further information on DVB-T broadcast signals can be found in, e.g., ETSI EN 300 744 V1.4.1 (2001-01), *Digital Video Broadcasting (DVB); Framing structure, channel coding and modulation for digital terrestrial television*. Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)) or discrete multitone (DMT), and receiver components such as a radio-frequency (RF) front-end, or receiver section, such as a low noise block, tuners, and demodulators, correlators, leak integrators and squarers is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. Finally, like-numbers on the figures represent similar elements.

Figure 1:
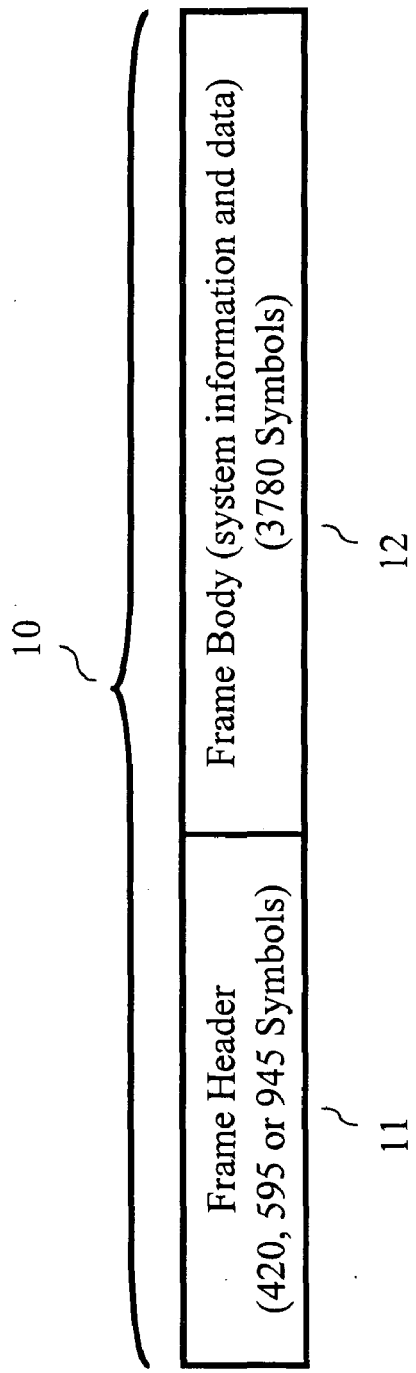
FIGS. 1 and 2 show a DMB-T frames and DMB-T frame headers.
Figure 2:
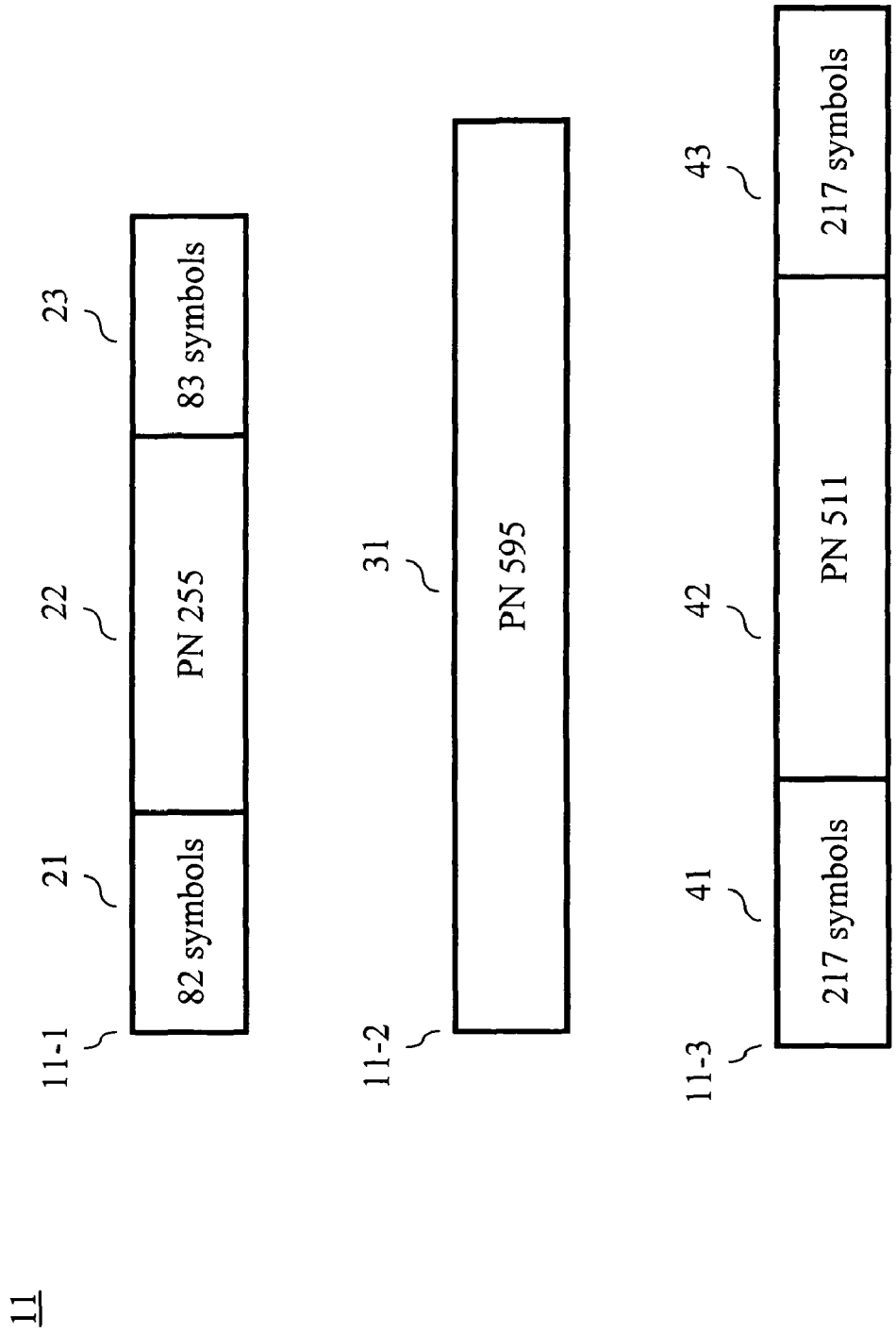

As described earlier, there are three different frame header modes in DMB-T. These are shown in FIG. 2. Frame header mode 1 (11-1) comprises a front synchronization portion (21), a PN255 sequence portion (22) and a rear synchronization portion (23). The front (21) and rear (23) synchronizations are cyclic extensions of the PN255 sequence (22). The length of the front synchronization is 82 symbols and the length of the rear synchronization is 83 symbols. For frame header mode 1, a group of 225 signal frames form a superframe (not shown) and these 225 frames use PN sequences generated by the same 8th-order linear shift register but have different initial phases. Frame header mode 2 (11-2) comprises a PN595 sequence, which is truncated from a 10th-order maximum length sequence. For example, frame header mode 2 (11-2) is made up of the first 595 symbols from a PN sequence of length 1023. For frame header mode 2, a group of 216 signal frames form a superframe. Unlike frame header mode 1, all frame headers contain the same PN595 sequence. Finally, frame header mode 3 (11-3) is similar to the structure of frame header mode 1 (11-1). Frame header mode 3 comprises a front synchronization (41), a PN511 sequence (42) and a rear synchronization (43). The front (41) and rear (43) synchronizations are cyclic extensions of the PN511 sequence (42). The length of the front synchronization is 217 symbols and the length of the rear synchronization is 217 symbols. For frame header mode 3, a group of 200 signal frames form a superframe and these 200 frames use PN sequences generated by the same 9th-order linear shift register having different initial phases. Notwithstanding the different structures for the different modes, and in accordance with the principles of the invention, a receiver performs frame timing synchronization by correlating groups of received symbols spaced at least two signal frames apart within a sample shift value. In the following description, it is assumed that the receiver has already determined the frame header mode in accordance with conventional techniques.

As noted above, the signal frame headers in a superframe use PN sequences which are generated by the same linear shift register but with different initial phases for frame header modes 1 and 3. These PN sequences are cyclic shifts of each other. The initial phases of the PN sequences for each signal frame of a superframe are listed in NSPRC, "Framing Structure, Channel Coding and Modulation for Digital Television Terrestrial Broadcasting System," NSPRC, August 2007, mentioned earlier. After computer verification, we have found that the PN sequences have the following structure. Let the PN sequence in the first signal frame be a reference PN sequence and $P_i(l)$ be the PN sequence which is cyclically right shifted by l places relative to the reference PN sequence for frame header mode i. Then for frame header mode 1 the following relationship holds:

$$F_1(l) = \begin{cases} P_1(l/2), & l = 0, 2, \ldots, 112 \\ P_1(254 - (l-1)/2), & l = 1, 3, \ldots, 111 \\ F_1(224 - l), & l = 113, \ldots, 224 \end{cases} \quad (1)$$

where $F_1(l)$ is the PN sequence which is used in the $l^{th}$ signal frame for frame header mode 1. In similar fashion, for frame header mode 3 the following relationship holds:

$$F_3(l) = \begin{cases} P_3(l/2), & l = 0, 2, 4, \ldots, 100 \\ P_3(510 - (l-1)/2), & l = 1, 3, 5, \ldots, 99 \\ F_3(200 - l), & l = 101, 102, \ldots, 199 \end{cases} \quad (2)$$

where $F_3(l)$ is the PN sequence which is used in the $l^{th}$ signal frame for frame header mode 3.

From the PN sequence structures given in equations (1) and (2), it is noted that except for the two signal frames in the middle (these are signal frames 111 and 113 in mode 1 and signal frames 99 and 101 in mode 3), the cyclic shift of the PN sequence for every other signal frame is either one place to the right or one place to the left. For the middle two signal frames (again, these are signal frames 111 and 113 in mode 1 and signal frames 99 and 101 in mode 3), the PN sequences which are one frame next to them are either cyclically shifted by one place or unchanged. Therefore, for every other signal frame, the frame headers have at least $L_i-1$ repeated PN symbols, $L_i$ is the length of the frame header for frame header mode i, where i=1, 3, (e.g., $L_1$=420 symbols and $L_3$=495 symbols). In view of this, and in accordance with the principles of the invention, the PN Frame Header Correlation (FHC) function with respect to the timing instance m and s sample shift is defined as:

$$R_{fhc}[m, s] = \sum_{k=0}^{G_i-2} r[m+k] \cdot r^*[m+k+2M_i+s]; \quad (3)$$

$$i = 1, 3; \quad s = -1, 0, 1$$

where r[m] is the sampled received signal, $G_i$ is the length of the PN sequence for frame header mode i, where i=1, 3, (e.g., $G_1$=255 symbols and $G_3$=511 symbols); the parameter $M_i$=N+$L_i$ is the length of a signal frame for frame header mode i, where i=1, 3, (e.g., $M_1$=4206 symbols, $M_3$=4725 symbols). As such, the optimal frame timing, $m_0$, is given by:

$$m_0 = \arg \max_{0 \leq m \leq M_i-1} \max_{-1 \leq s \leq 1} |R_{fhc}[m, s]| \quad (4)$$

Figure 3:
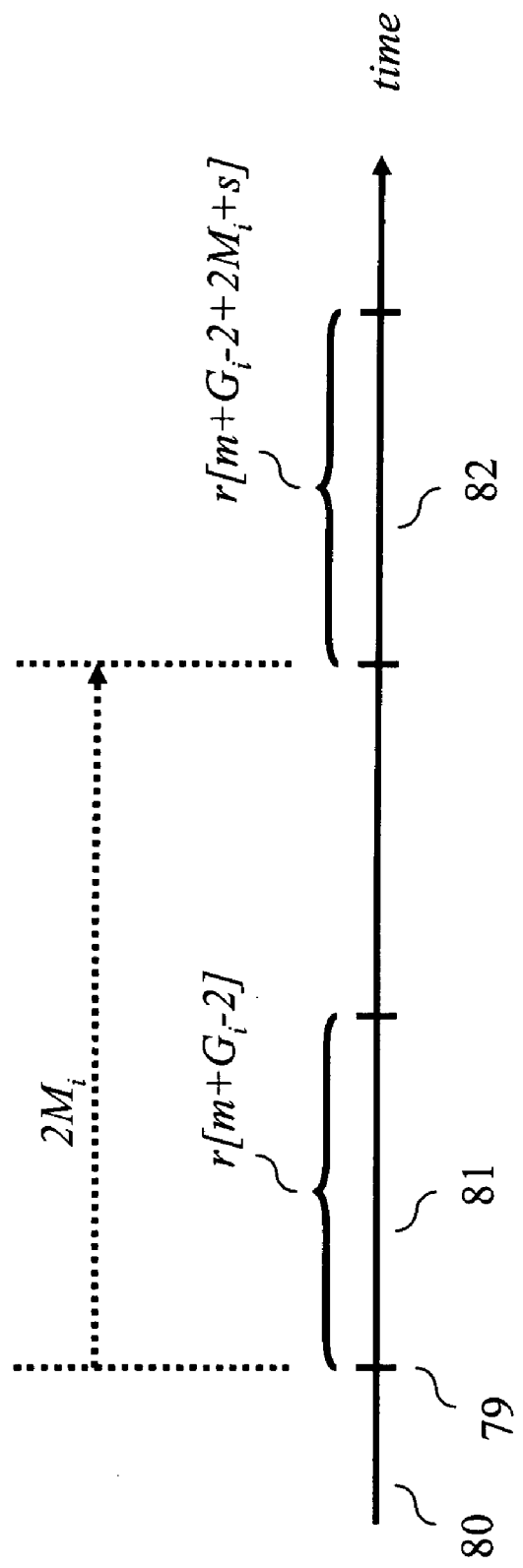
FIG. 3 shows illustrative data segments in accordance with the principles of the invention.

It should be noted that it is assumed that the sample timing is equal to the symbol timing. However, the inventive concept is not so limited and the sample timing can different from the symbol timing. Equation (3) is conceptually illustrated in FIG. 3. A received signal, r, 80 is sampled for providing a sequence of samples, e.g., sample 79 represents r[m] (at k=0). A sequence of samples 81 (from $0 \leq k \leq (G_i-2)$) are multiplied by corresponding samples from a sequence of samples 82 (from $0 \leq k \leq (G_i-2)$) located $2M_i$ samples away, i.e., at least two signal frames apart, and shifted forward or backward by s samples, where $-1 \leq s \leq 1$. In essence, a sliding window correlation that is spaced at least two signal frames apart within a sample shift value. Once $m_0$ has been determined (equation (4)), the value of $m_0$ represents where the frame starts in symbols.

Figure 4:
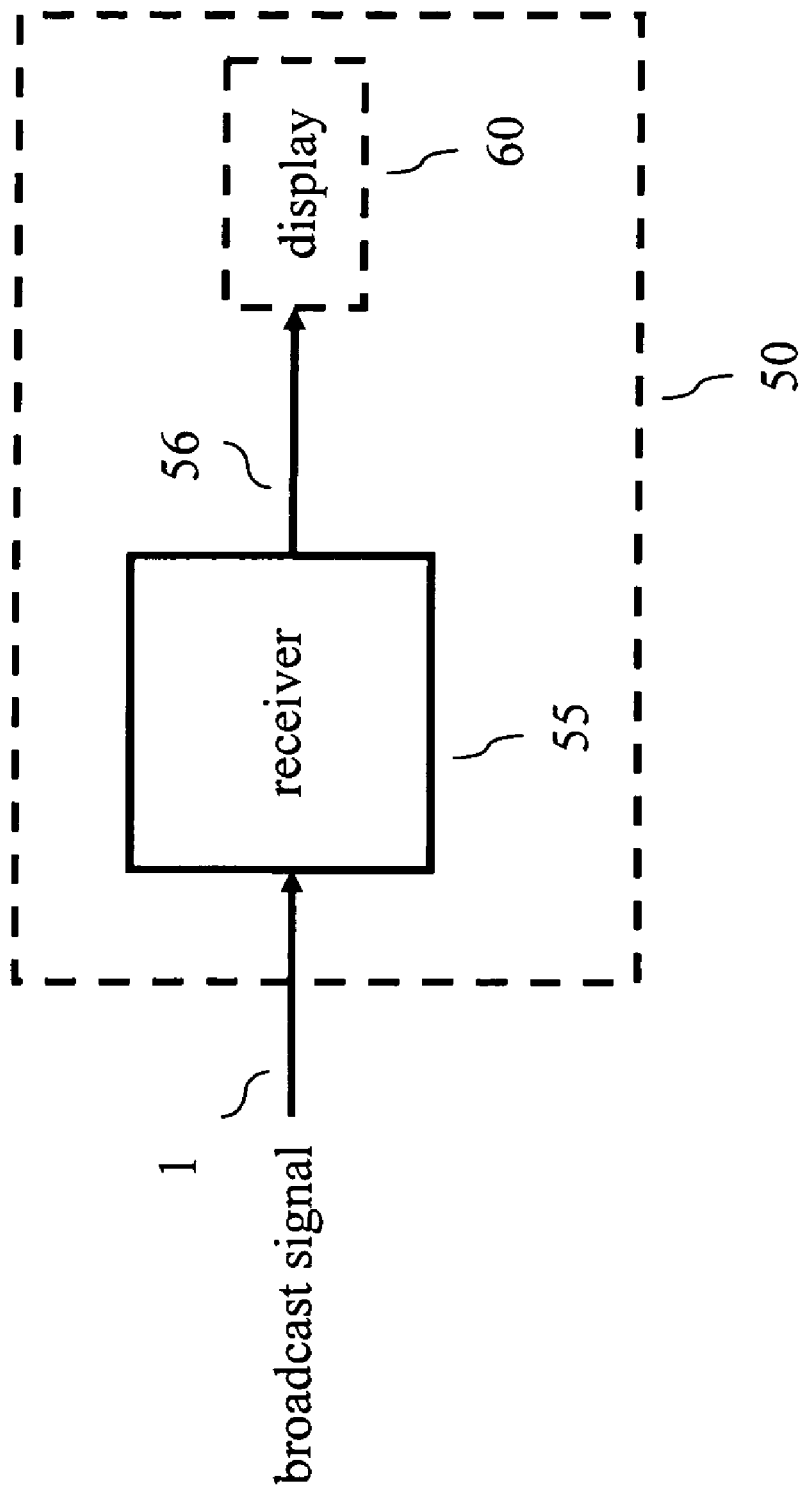
FIG. 4 shows an illustrative embodiment of an apparatus in accordance with the principles of the invention.

Referring now to FIG. 4, an illustrative embodiment of a device 50 in accordance with the principles of the invention is shown. Device 50 is representative of any processor-based platform, e.g., a PC, a server, a set-top box, a personal digital assistant (PDA), a cellular telephone, a mobile digital television (DTV), a DTV, etc. In this regard, device 50 includes one, or more, processors with associated memory (not shown) and also comprises receiver 55. The latter receives a broadcast signal 1 via an antenna (not shown)). For the purposes of this example, it is assumed that broadcast signal 1 is representative of a digital television (DTV) service, i.e., a DTV transport stream, which includes video, audio and/or system information for at least one TV channel and that broadcast signal 1 conveys this information using either a single carrier (SC) modulation or a multi-carrier modulation such as orthogonal frequency division multiplexing (OFDM). Illustratively, it is assumed the DTV service is conveyed via DMB-T. However, the inventive concept is not so limited. Since, in this example, broadcast signal 1 uses at least three types of frame header modes, receiver 55 processes received broadcast signal 1 in accordance with the principles of the invention for performing frame timing synchronization. Subsequent to acquiring frame timing synchronization, receiver 55 further processes received broadcast signal 1 to recover therefrom output signal 56 for application to a output device 60, which may, or may not, be a part of device 50 as represented in dashed-line form. In the context of this example, output device 60 is a display that allows a user to view a selected TV program.

Figure 5:
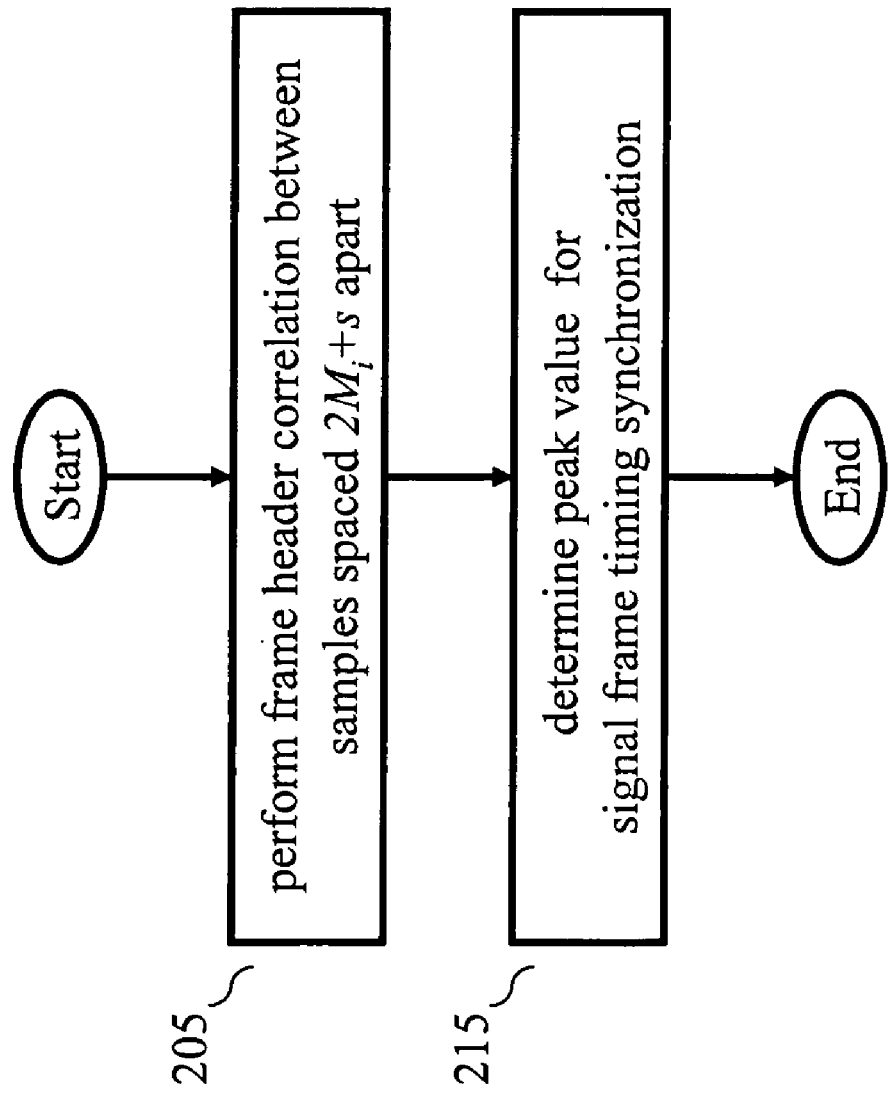
FIG. 5 shows an illustrative flow chart in accordance with the principles of the invention.

Referring now to FIG. 5, an illustrative flow chart in accordance with the principles of the invention for use in device 50 is shown. In step 205, receiver 55 performs frame header correlation (equation (3)) on samples from a sampled received signal (e.g., refer back to FIG. 3). From this data, receiver 55 determines a peak value, $m_0$, (equation (4)) in step 215. The value $m_0$ represents where the frame starts. Receiver 55 signals frame timing synchronization has been achieved also in step 215.

Figure 6:
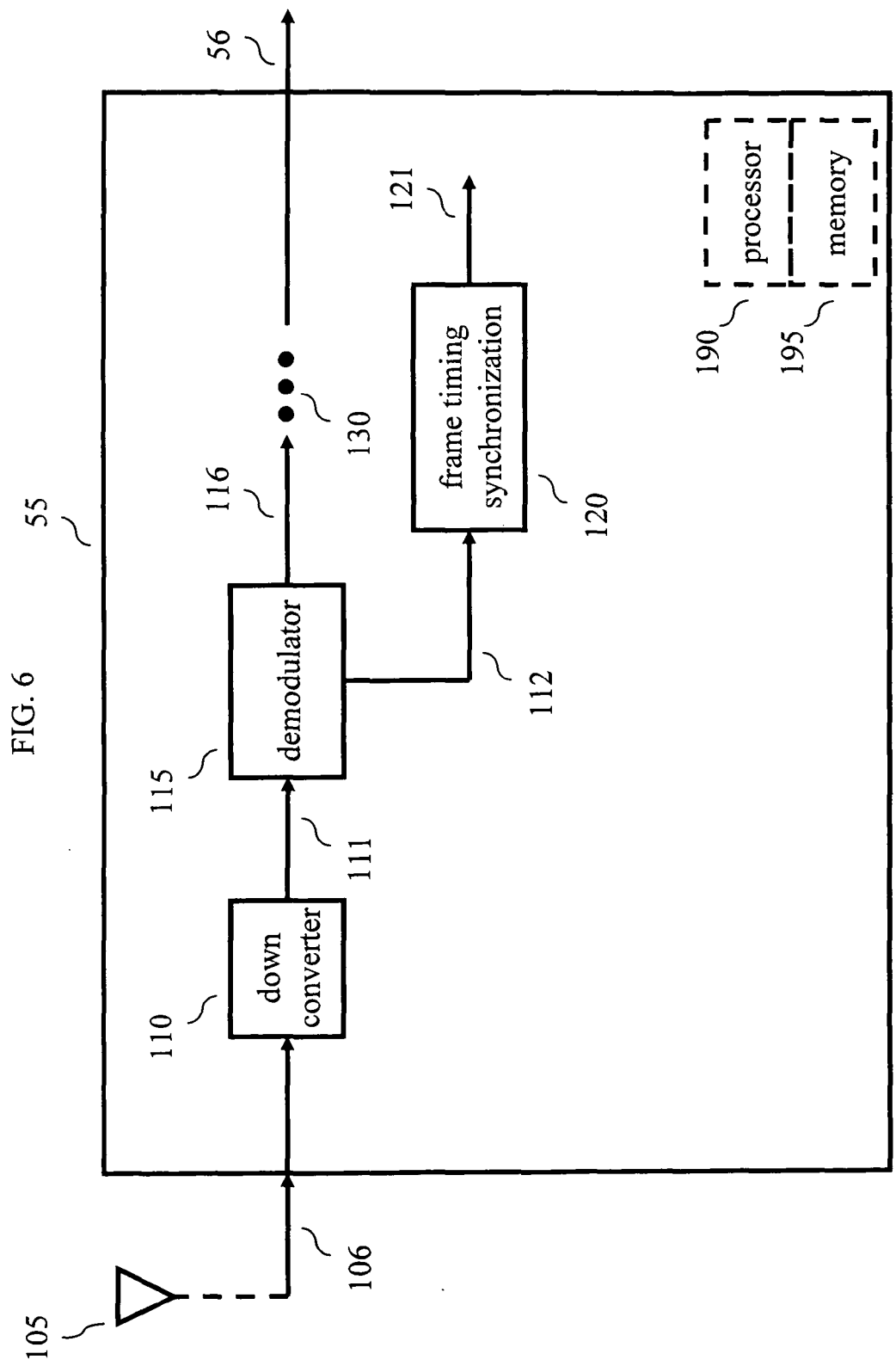
FIG. 6 shows an illustrative embodiment of a receiver in accordance with the principles of the invention.

Turning now to FIG. 6, an illustrative portion of receiver 55 is shown. Only that portion of receiver 55 relevant to the inventive concept is shown. Receiver 55 comprises down converter 110, demodulator 115, and frame timing synchronizer 120. In addition, receiver 55 is a processor-based system and includes one, or more, processors and associated memory as represented by processor 190 and memory 195 shown in the form of dashed boxes in FIG. 6. In this context, computer programs, or software, are stored in memory 195 for execution by processor 190, e.g., the above described flow chart of FIG. 5. Processor 190 is representative of one, or more, stored-program control processors and these do not have to be dedicated to the receiver function, e.g., processor 190 may also control other functions of receiver 55. For example, if receiver 55 is a part of a larger device, processor 190 may control other functions of this device. Memory 195 is representative of any storage device, e.g., random-access memory (RAM), read-only memory (ROM), etc.; may be internal and/or external to receiver 55; and is volatile and/or non-volatile as necessary.

Antenna 105 of FIG. 6 receives a broadcast signal and provides it to receiver 55. In this example, antenna 105 provides received broadcast signal 106 to down converter 110. Down converter 110 is representative of the front-end processing of receiver 55 and includes, e.g., a tuner (not shown), etc., for tuning to and down converting received broad cast signal 106 to provide a base-band, or intermediate frequency (IF), received signal 111 for further processing by receiver 55. Received signal 111 is applied to demodulator 115. In the context of DMB-T, demodulator 115 supports N modes of demodulation, where N>1. In the context of this example, N=2, where one demodulation mode is an OFDM mode and another demodulation mode is a SC mode. For the purposes of this example, it is assumed that received signal 111 is representative of an OFDM signal using either frame header mode 1 or frame header mode 3. Demodulator 115 demodulates received signal 111 to provided demodulated signal 116, which is then further processed by receiver 55 as known in the art (as represented by ellipses 130) to provide output signal 16. In accordance with the principles of the invention, frame timing synchronizer 120 processes data from demodulator 115 via signal path 112 (as described above with respect to the flow chart of FIG. 5) to achieve frame timing synchronization for use by receiver 55. This is illustrated in FIG. 6, by signal 121, which signals that framing timing synchronization has been achieved (e.g., step 215 of FIG. 5) for use by receiver 55. It should be noted that although the various elements of FIG. 6 are represented as single blocks, the invention is not so limited. For example, there may be separate demodulators, each supporting one, or more, types of demodulation.

It should be noted that the PN frame headers in modes 1 and 3 are also designed to indicate signal frame numbers in DMB-T. In that regard, recognition of the PN sequence used in frame header modes 1 and 3 in accordance with the principles of the invention can be used to detect the frame number. In fact, use of equations (1) and (2) leads to a low complexity frame number detector. Furthermore, this low complexity frame number detector is immune to frequency offset.

Let $S_i(l)$ be the number of cyclically right shifts from $F_i(l)$ to $F_i(l+1)$, according to (1) and (2), for i=1, 3, for frame header mode 1 and frame header mode 3, respectively. In particular, for frame header mode 1, $$S_1(l) = \begin{cases} (-1)^{l+1}(l+1), & 0 \leq l \leq 111 \\ (-1)^{l+1}(224-l), & 112 \leq l \leq 224 \end{cases} \quad (5)$$

and for frame header mode 3:

$$S_3(l) = \begin{cases} (-1)^{l+1}(l+1), & 0 \leq l \leq 99 \\ (-1)^{l+1}(200-l), & 100 \leq l \leq 199. \end{cases} \quad (6)$$

It should be noted that the value of $S_i(l)$ being negative indicates a cyclic shift to the left. Thus, there is an unique cyclic shift from $F_i(l)$ to $F_i(l+1)$. It should also be noted that there are $L_i - |S_i(l)|$ repeated symbols for frame header l and l+1. From equations (5) and (6) two look-up tables (LUTs) can be constructed. One LUT for frame header mode 1 and the other LUT for frame header mode 3. In each LUT, each cyclic shift, s, is associated with a value of l, the frame number. For frame header mode 1, there are at least $Z_1$=308 repeated symbols in two consecutive frame headers and for frame header mode 3, there are at least $Z_3$=845 repeated symbols in two consecutive frame headers. Now, let $R_{pnc}^R[s]$ and $R_{pnc}^L[s]$ be the PN correlation functions with respect to s samples being shifted to the right and to the left:

$$R_{pnc}^R[s] = \sum_{k=0}^{Z_i-1} r[m_0+k] \cdot r^*[m_0+k+M_i+s]; \quad (7)$$

$$R_{pnc}^L[s] = \sum_{k=0}^{Z_i-1} r[m_0+k+s] \cdot r^*[m_0+k+M_i].$$

for i=1, 3; and where $0 \leq s \leq 112$ for $R_{pnc}^R[s]$ and where $1 \leq s \leq 112$ for $R_{pnc}^L[s]$. Then, let $$s_R = \arg\max_{0 \leq s \leq 112} |R_{pnc}^R[s]|, i = 1, 3, \quad (8)$$

$$s_L = \arg\max_{1 \leq s \leq 112} |R_{pnc}^L[s]|, i = 1, 3,$$

Finally, the estimated cyclic shift of the PN sequence from $F_i(l)$ to $F_i(l+1)$ is given by:

$$\hat{s} = \begin{cases} s_R, & \text{if } |R_{pnc}^R[s_R]| \geq |R_{pnc}^L[s_L]| \\ -s_L, & \text{if } |R_{pnc}^R[s_R]| < |R_{pnc}^L[s_L]| \end{cases}. \quad (9)$$

The value of $\hat{s}$ in equation (9) is then used to retrieve from the appropriate LUT the associated frame number, l.

Figure 13:
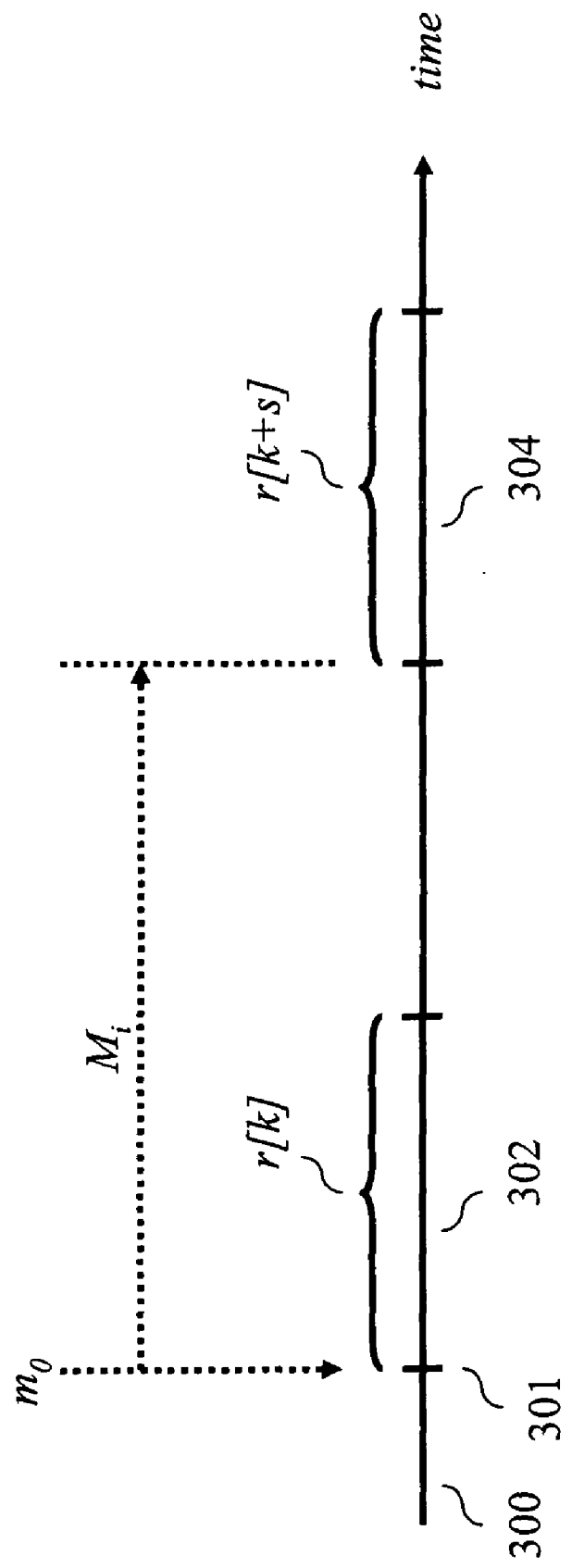
FIG. 13 shows illustrative data segments in accordance with the principles of the invention.

As further illustration, $R_{pnc}^R[s]$ from equation (7) is conceptually illustrated in FIG. 13. Once frame synchronization is determined, e.g., using the value of $m_0$ from equation (4), those portions of adjacent signal frames having repeated symbols are correlated together. This is illustrated in FIG. 13 by portion 301 of a first frame and portion 302 of the next adjacent frame.

Figure 14:
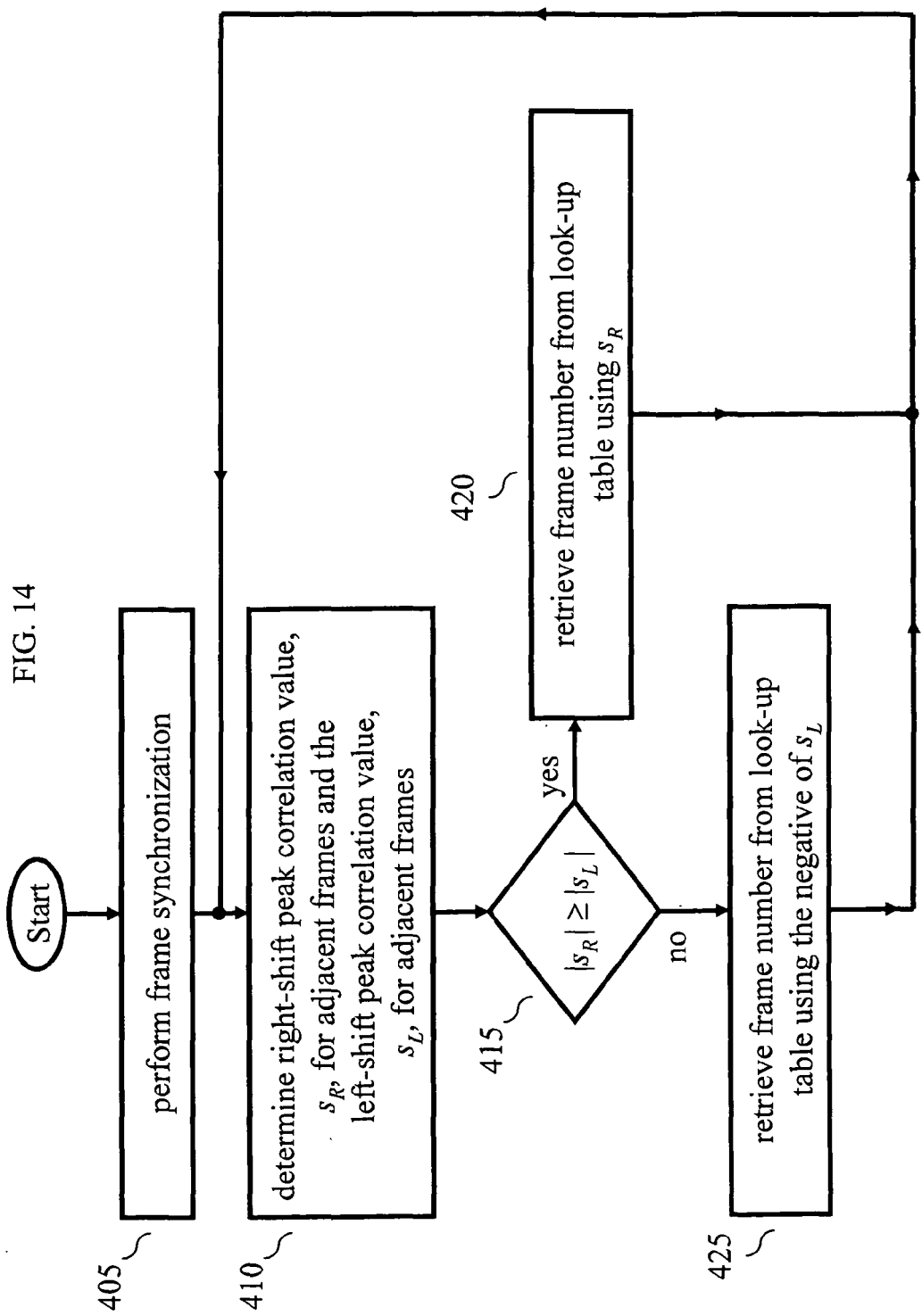
FIG. 14 shows another illustrative flow chart in accordance with the principles of the invention.

Referring now to FIG. 14, an illustrative flow chart in accordance with the principles of the invention for use in device 50 is shown. In step 405, receiver 55 performs frame synchronization (e.g., using the method shown in FIG. 5 and described earlier). Once frame synchronization is accomplished, receiver 55 determines, in step 410, a maximum right-shift correlation value, $s_R$ and a maximum left-shift correlation value, $s_L$ (e.g., from equation (7) and equation (8) above). In step 415, the magnitudes of these values are compared. If the magnitude of the maximum right-shift correlation value is greater than, or equal to, the magnitude of the maximum left-shift correlation value, then the maximum right shift correlation value is used to retrieve a frame number from a look-up table in step 420 (equation (9)). Otherwise, the negative value of the maximum left-shift correlation value is used to retrieve a frame number from the look-up table in step 425 (equation (9)). This process continues for adjacent frames in a superframe.

Figure 15:
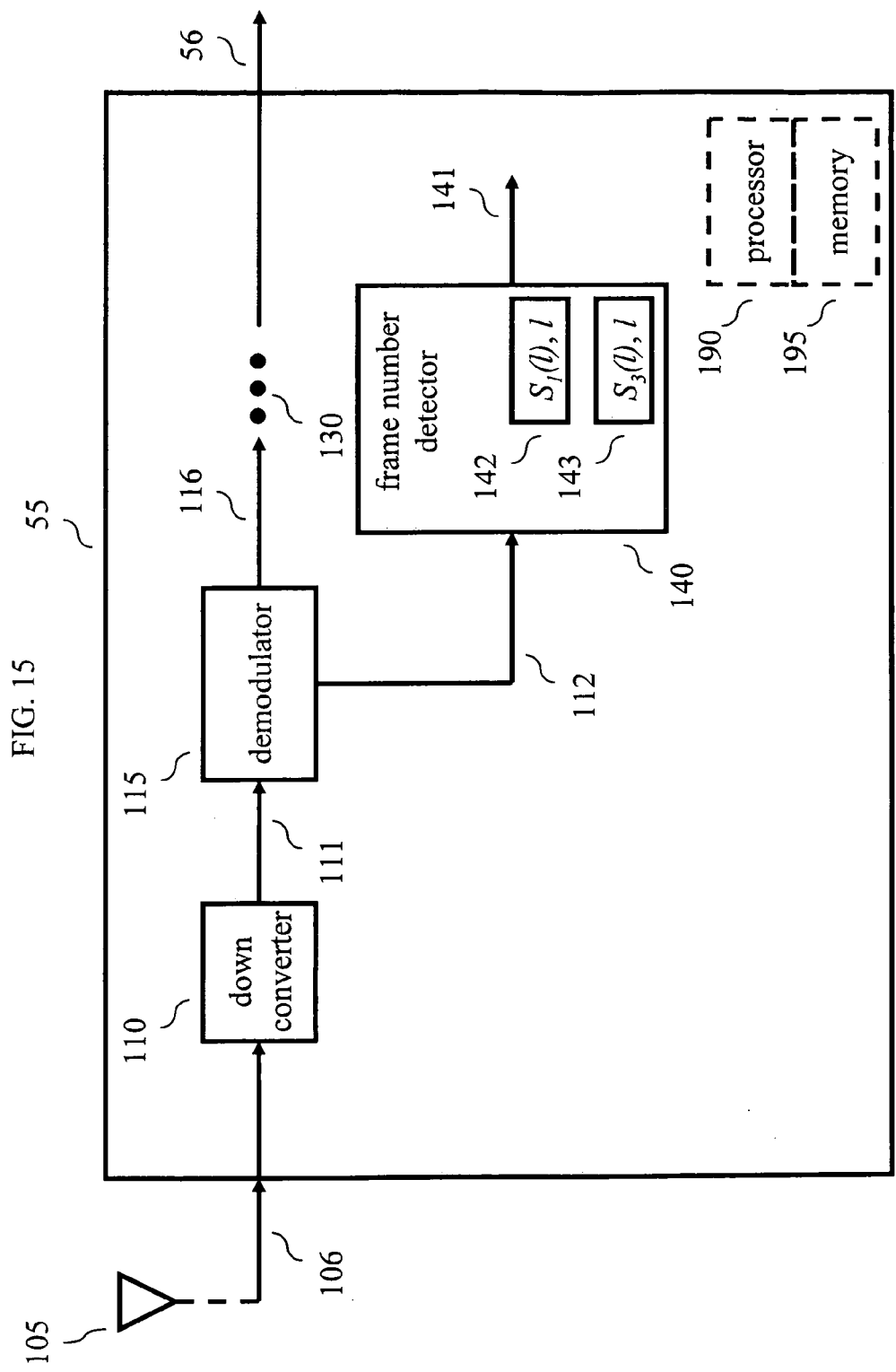
FIG. 15 shows an illustrative embodiment of a receiver in accordance with the principles of the invention.

Turning now to FIG. 15, another illustrative portion of receiver 55 is shown. Only that portion of receiver 55 relevant to the inventive concept is shown. This portion of receiver 55 is similar to that shown in FIG. 6 except for the addition of frame number detector 140. Frame number detector 140 comprises two look-up tables 142 and 143. Look-up table 142 is associated with frame header mode 1 and associates each cyclic right shift with a frame number for that mode. Likewise, look-up table 143 is associated with frame header mode 3 and associates each cyclic right shift with a frame number for that mode. In accordance with the principles of the invention, frame number detector 140 processes data from demodulator 115 via signal path 112 (as described above with respect to the flow chart of FIG. 14) to determine frame numbers for use by receiver 55. This is illustrated in FIG. 15, by signal 141, which provides a frame number for each received frame.

As shown in FIG. 2, for frame header mode 1 and 3, a frame header comprises a PN sequence and its cyclic extension. Thus, in frame header mode 1, the first 165 symbols of the frame header are repetitions of the last 165 symbols of the frame header. Likewise, in frame header mode 3, the first 434 symbols of the frame header are repetitions of the last 434 symbols of the frame header. As such, correlation between these cyclic extensions can also be used to perform frame timing synchronization. In particular, the Cyclic Extension Correlation (CEC) function with respect to the timing instance m is defined as:

$$R_{cec}[m] = \frac{1}{C_i} \sum_{k=0}^{C_i-1} r[m+k] \cdot r^*[m+k+G_i], i = 1, 3. \quad (10)$$

The parameter $C_1=165$ is the number of cyclic extended symbols, and $G_1=255$ is the length of the PN sequence for frame header mode 1. Similarly, the parameter $C_3=434$ is the number of cyclic extended symbols, and $G_3=511$ is the length of the PN sequence for frame header mode 3. Then, the optimal frame timing (sample index at the beginning of a signal frame) is given by:

$$m_1 = \arg\max_{0 \leq m \leq M_i-1} |R_{cec}[m]|. \quad (11)$$

It should be noted that the presence of frequency offset causes a phase rotation proportional to the timing index. Thus, it is common to estimate the frequency offset $\Delta f$ by:

$$\Delta \hat{f} = \text{Arg}(R_{cec}[m_1]) \cdot \frac{f_s}{2\pi G_i} \quad (12)$$

where $f_s=7.56$ MHz is the symbol rate of the DMB-T system (e.g., see F. Tufvesson, O. Edfors and M. Faulkner, "Time and Frequency Synchronization for OFDM Using PN-Sequence Preambles," *Proc. IEEE VTC*, pp. 2203-2207, September 1999). The function $\text{Arg}(\cdot)$ is the mod-$2\pi$ angle of the argument. It should be noted that because of the phase ambiguity, the frequency offset estimator given in equation (12) has its limitations. For frame header mode 1, this estimator can estimate reliably when $|\Delta f|<29647$ Hz and for frame header mode 3, this estimator can estimate reliably when $|\Delta f| \leq 14794$ Hz.

Figure 7:
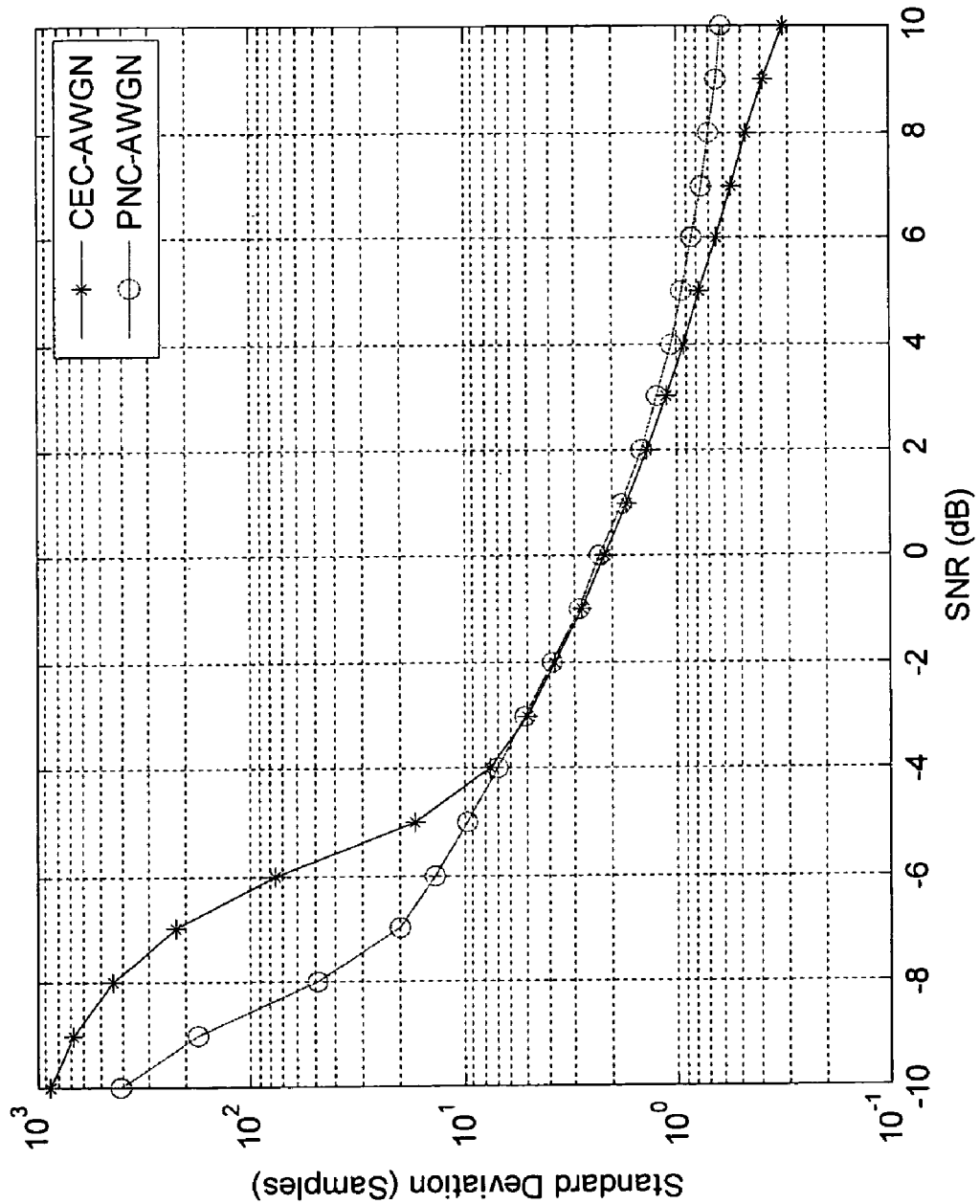
FIGS. 7-12 shows performance graphs for the various methods described herein.
Figure 8:
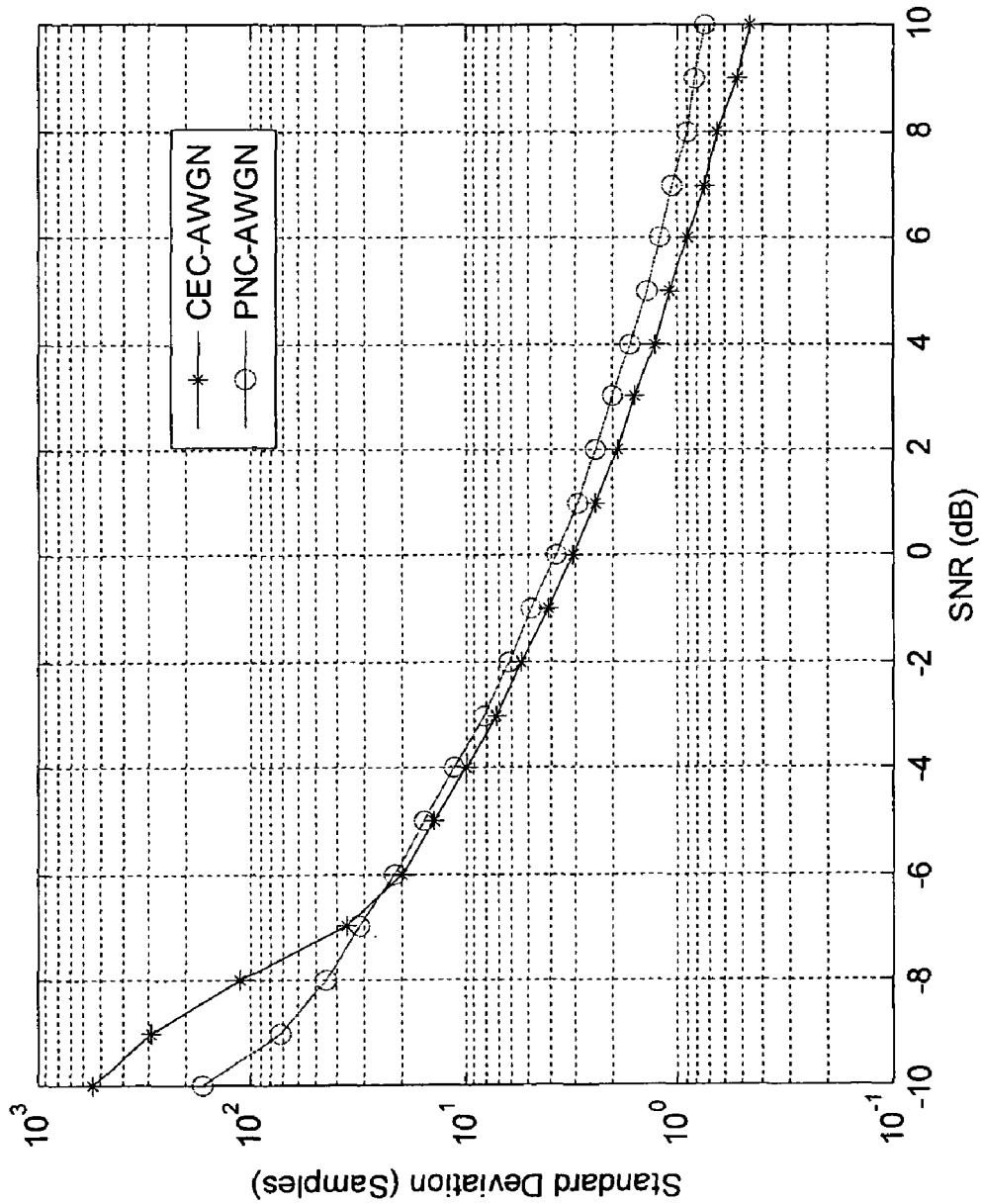
Figure 9:
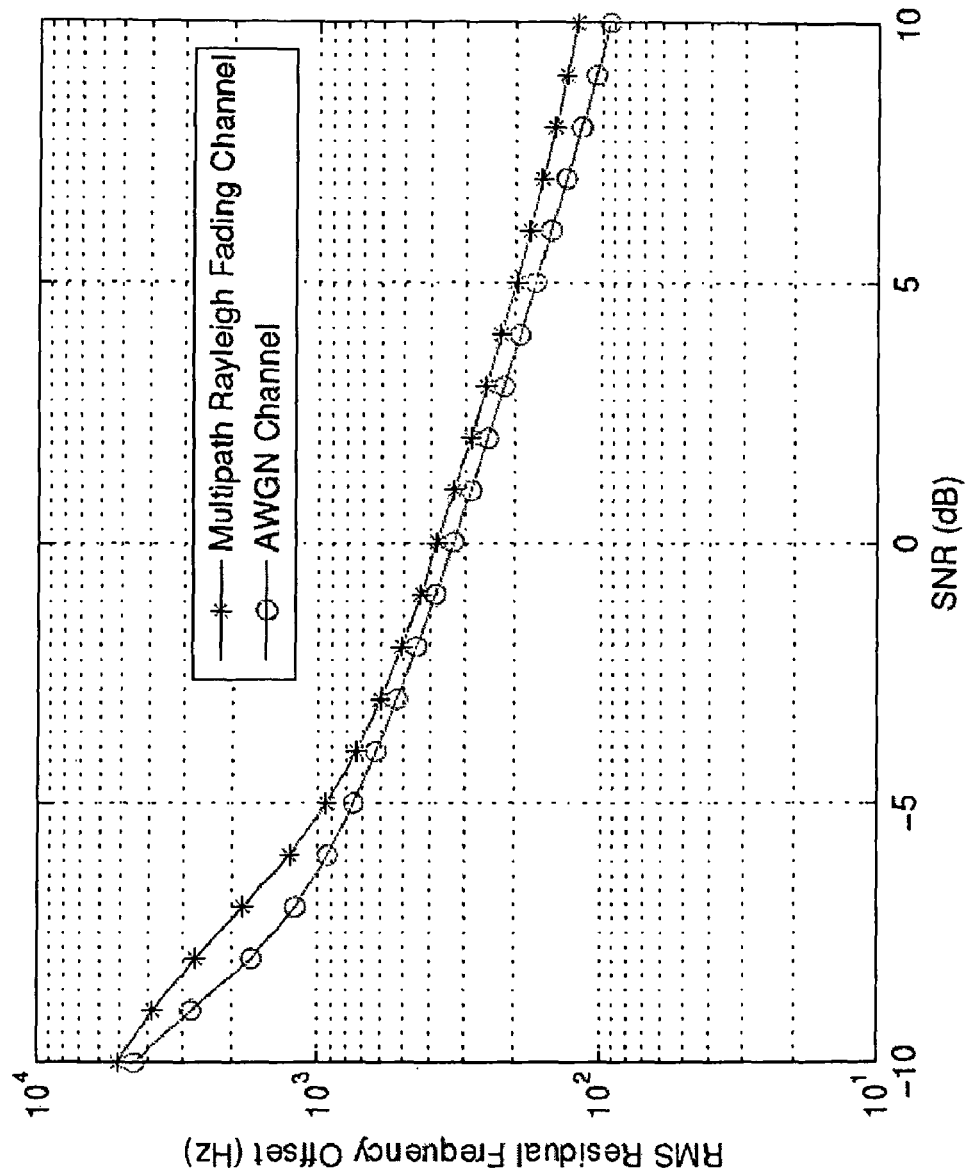
Figure 10:
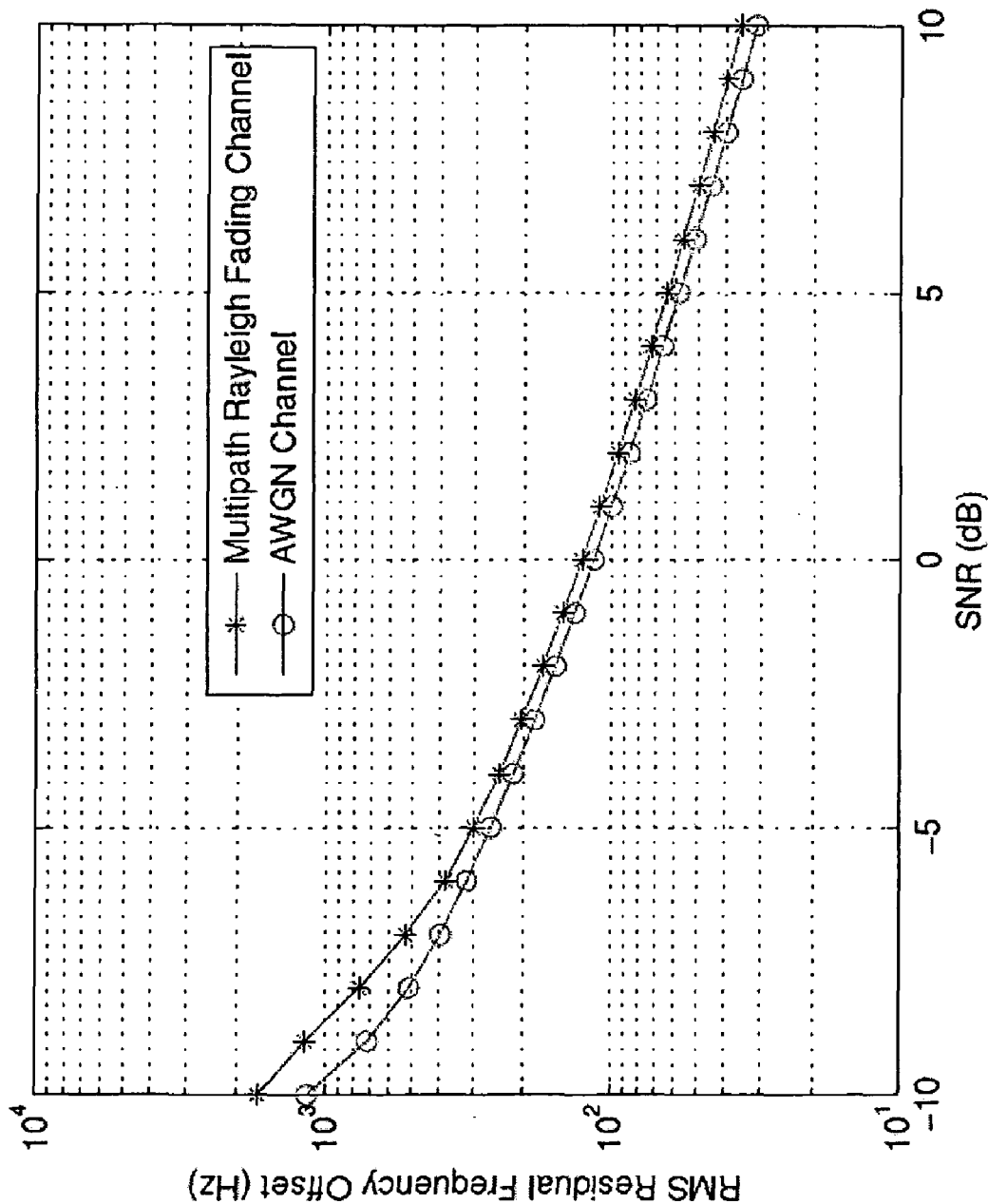
Figure 11:
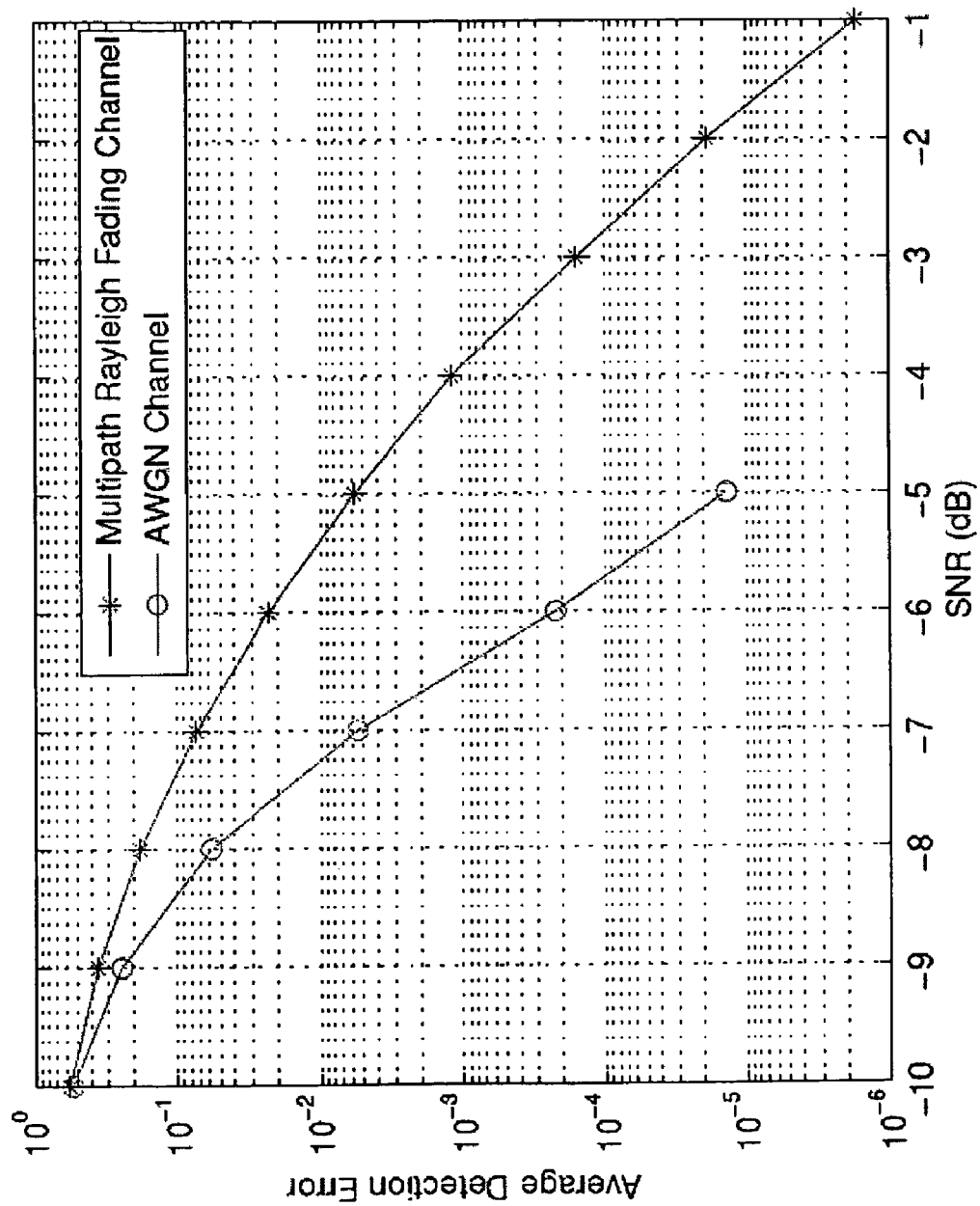
Figure 12:
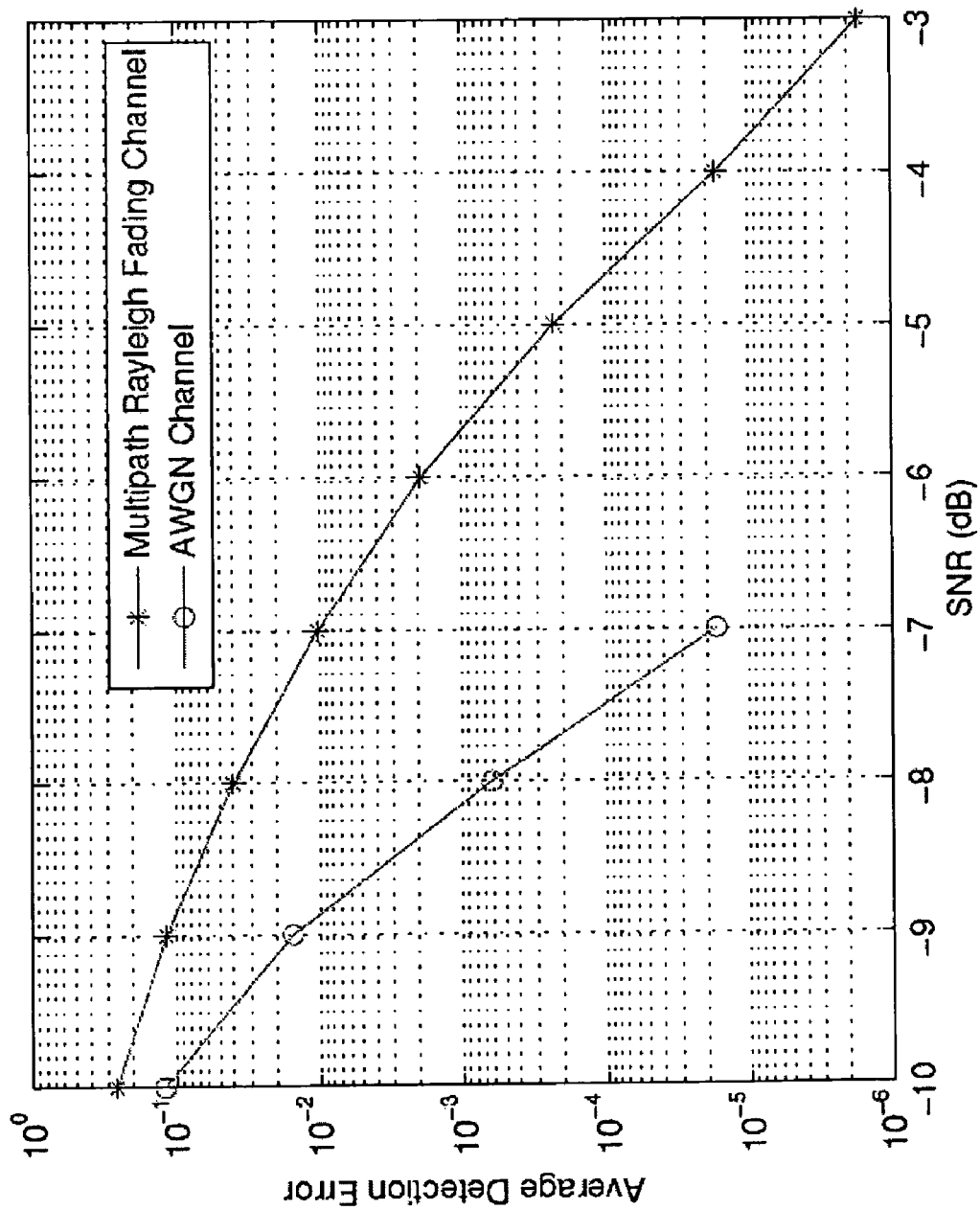

The performances of the proposed frame timing synchronizers, frequency offset estimator and frame number detector have been demonstrated by computer simulations. The simulation environments are the additive white Gaussian noise (AWGN) and multipath Rayleigh fading channel with root mean square (RMS) delay spread equal to 1.24 µs (9.37 samples). For the multipath Rayleigh fading channel, the envelope of each single path is Rayleigh distributed and the channel gains of each path are generated by Jakes fading model (e.g., see P. Dent, E. G. Bottomley, and T. Croft, "Jakes Fading Model Revisited," *Electronics Letters*, Vol. 29, No. 13, pp. 1162-1163, June 1993). FIGS. 7 and 8 show the standard deviation of the estimated timing for frame header mode 1 (FIG. 7) and frame header mode 3 (FIG. 8) under an AWGN environment. It can be observed that the standard deviation is less than one sample when the SNR is around 5 dB. The frequency offset is set to 14 kHz in the simulation. As can be seen in FIG. 9 (for frame header mode 1) and FIG. 10 (for frame header mode 3), the root mean square (RMS) residual frequency offset is close to 300 Hz for frame header mode 1 and close to 100 Hz for frame header mode 3 when the SNR is 0 dB. Finally, with respect to the frame header number detection, it can be observed in FIG. 11 (frame header mode 1) and FIG. 12 (frame header mode 3) that the proposed algorithm yields excellent performance, and that a frame number detection error is unlikely to occur when the SNR is larger than −3 dB. It should be noted that the frame timing used in the frame number detector is obtained from the PNS timing synchronizer of equations (3) and (4).

As described above, and in accordance with the principles of the invention, a frame timing synchronizer and a frame number detector utilize PN patterns in frame header modes 1 and 3. A joint frame timing and frequency offset estimator based on the property of cyclic extension in the frame headers was also described above. Simulation results show that the performances of all proposed algorithms are excellent. Furthermore, the complexities of the proposed algorithms are very low, and hence, they can be easily applied in practical systems. Although described in the context of an OFDM signal, the inventive concept is also applicable to a single carrier signal. Further, it should be realized that conventional correlation techniques can be used for frame header mode 2.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
   receiving a signal for providing a sequence of received symbols, the received signal having an associated signal frame structure with a superframe comprising a plurality of frames, each frame comprising a group of received symbols and each frame having a header with a pseudonoise sequence that may have different initial phases; and
   determining a frame number for at least one frame in the superframe by autocorrelating groups of the received symbols in adjacent frames, the groups of symbols comprising the pseudonoise sequence of the frame headers of the adjacent frames, wherein the determining step comprises:
      determining a maximum right-shift correlation value from right-shift autocorrelations;
      determining a maximum left-shift correlation value from left-shift autocorrelations; and
      comparing the maximum right-shift and left-shift correlation values for determining a pointer into a look-up table for determining the frame number.

2. The method of claim 1, wherein the signal frame structure comprises a plurality of frame header modes, each frame header mode having a pseudonoise sequence.

3. The method of claim 2, wherein the signal is a Digital Multimedia Broadcasting-Terrestrial television signal with frame header mode 1 or frame header mode 3.

4. The method of claim 1, wherein the determining step comprises:
   retrieving the frame number from the look-up table using the maximum right shift correlation value as the pointer if the magnitude of the maximum right-shift correlation value is greater than, or equal to, the magnitude of the maximum left-shift correlation value;
   otherwise, retrieving the frame number from the look-up table using the negative value of the maximum left-shift correlation value as the pointer.

5. Apparatus comprising:
   a demodulator for receiving a signal to provide a sequence of received symbols, the received signal having an associated signal frame structure with a superframe comprising a plurality of frames, each frame comprising a group of received symbols and each frame having a header with a pseudonoise sequence that may have different initial phases; and
   a processor for determining a frame number for at least one frame in the superframe by autocorrelating groups of the received symbols in adjacent frames, the autocorrelated symbols comprising the pseudonoise sequence of the frame headers of the adjacent frames, wherein the processor determines a maximum right-shift correlation value from right-shift autocorrelations and a maximum left-shift correlation value from left-shift autocorrelations and compares them for determining a pointer into a look-up table for determining the frame number.

6. The apparatus of claim 5, wherein the signal frame structure comprises a plurality of frame header modes, each frame header mode having a pseudonoise sequence.

7. The apparatus of claim 6, wherein the signal is a Digital Multimedia Broadcasting-Terrestrial television signal with frame header mode 1 or frame header mode 3.

8. The apparatus of claim 5, wherein the processor retrieves the frame number from the look-up table using the maximum right shift correlation value as the pointer if the magnitude of the maximum right-shift correlation value is greater than or equal to the magnitude of the maximum left-shift correlation value, otherwise, the processor retrieves the frame number from the look-up table using the negative value of the maximum left-shift correlation value as the pointer.

9. The method of claim 1 comprising performing a frame synchronization before performing the determining step.

10. The apparatus of claim 5, wherein the processor performs a frame synchronization before determining the frame number.

* * * * *